(12) United States Patent
Hosking

(10) Patent No.: US 8,498,541 B2
(45) Date of Patent: Jul. 30, 2013

(54) BACKDOOR DIAGNOSTIC COMMUNICATION TO TRANSCEIVER MODULE

(75) Inventor: Lucy G. Hosking, Santa Cruz, CA (US)

(73) Assignee: Finisar Corporation, Sunnyvale, CA (US)

( * ) Notice: Subject to any disclaimer, the term of this patent is extended or adjusted under 35 U.S.C. 154(b) by 1029 days.

(21) Appl. No.: 12/184,101

(22) Filed: Jul. 31, 2008

(65) Prior Publication Data

US 2010/0028015 A1    Feb. 4, 2010

(51) Int. Cl.
G02B 6/36 (2006.01)

(52) U.S. Cl.
USPC ............. 398/138; 398/136; 398/137; 398/30; 398/164

(58) Field of Classification Search
USPC .................................................. 398/135–139
See application file for complete search history.

(56) References Cited

U.S. PATENT DOCUMENTS

| | | | |
|---|---|---|---|
| 5,812,572 A | 9/1998 | King et al. | |
| 6,141,125 A * | 10/2000 | Blair et al. | 398/32 |
| 6,692,132 B1 | 2/2004 | Meeker | |
| 6,975,395 B1 | 12/2005 | Gentieu et al. | |
| 7,072,587 B2 * | 7/2006 | Dietz et al. | 398/138 |
| 7,215,891 B1 | 5/2007 | Chiang et al. | |
| 7,268,688 B2 | 9/2007 | Juds | |
| 7,286,736 B2 * | 10/2007 | Rosenberg | 385/52 |
| 7,320,551 B1 | 1/2008 | Moore et al. | |
| 7,426,348 B2 * | 9/2008 | Mahowald et al. | 398/135 |
| 7,507,111 B2 | 3/2009 | Togami et al. | |
| 7,532,820 B2 * | 5/2009 | Aronson | 398/135 |
| 7,630,631 B2 * | 12/2009 | Aronson et al. | 398/22 |
| 7,721,012 B2 | 5/2010 | Le et al. | |
| 7,757,936 B2 | 7/2010 | Aguren et al. | |
| 8,135,282 B2 | 3/2012 | Hosking | |
| 2002/0149821 A1 | 10/2002 | Aronson et al. | |
| 2003/0020986 A1 | 1/2003 | Pang et al. | |
| 2003/0053170 A1 | 3/2003 | Levinson et al. | |
| 2003/0057984 A1 | 3/2003 | Akram | |
| 2003/0163508 A1 * | 8/2003 | Goodman | 709/100 |
| 2003/0231839 A1 | 12/2003 | Chen et al. | |
| 2004/0071471 A1 * | 4/2004 | Baker et al. | 398/140 |
| 2004/0213286 A1 | 10/2004 | Jette et al. | |
| 2005/0032415 A1 | 2/2005 | Sakamoto | |
| 2005/0079831 A1 * | 4/2005 | Ramachandran | 455/90.3 |
| 2005/0105915 A1 | 5/2005 | Light | |
| 2005/0196111 A1 * | 9/2005 | Burdick et al. | 385/92 |
| 2005/0196322 A1 | 9/2005 | Truex | |
| 2005/0232643 A1 * | 10/2005 | Aronson et al. | 398/183 |
| 2005/0238305 A1 | 10/2005 | Miller et al. | |
| 2006/0062116 A1 | 3/2006 | Ishibashi | |
| 2006/0189220 A1 * | 8/2006 | Duval et al. | 439/760 |
| 2007/0058980 A1 | 3/2007 | Hidaka | |
| 2007/0058987 A1 | 3/2007 | Suzuki | |
| 2007/0092257 A1 * | 4/2007 | Smith et al. | 398/135 |
| 2007/0291491 A1 | 12/2007 | Li et al. | |
| 2009/0261955 A1 | 10/2009 | Moore et al. | |
| 2010/0027991 A1 | 2/2010 | Hosking | |
| 2010/0054733 A1 | 3/2010 | Hosking | |
| 2010/0054734 A1 | 3/2010 | Hosking | |
| 2010/0054749 A1 | 3/2010 | Hosking | |

OTHER PUBLICATIONS

U.S. Appl. No. 12/184,042, mailed May 3, 2011, Office Action.

(Continued)

Primary Examiner — Danny Leung
(74) Attorney, Agent, or Firm — Maschoff Brennan

(57) ABSTRACT

Exemplary embodiments of the invention relate to an optical transceiver module having a diagnostic communications link, wherein the link is configured to access diagnostic and other data contained within the transceiver controller via a backdoor interface. Controller data, including operational parameter values and module setup values, is accessible while the transceiver operates in conjunction with an external host and may be retrieved, and sometimes modified, in real time without interrupting normal transceiver operation or suspending the transmission of data over optical fibers. The data is accessed with an external user device via a backdoor interface on the outside of the transceiver module.

20 Claims, 8 Drawing Sheets

OTHER PUBLICATIONS

U.S. Appl. No. 12/184,042, mailed Aug. 22, 2011, Office Action.
U.S. Appl. No. 12/184,042, mailed Jan. 19, 2012, Notice of Allowance.
U.S. Appl. No. 12/184,093, mailed Apr. 19, 2011, Office Action.
U.S. Appl. No. 12/184,093, mailed Sep. 13, 2011, Office Action.
U.S. Appl. No. 12/184,093, mailed Nov. 3, 2011, Notice of Allowance.
U.S. Appl. No. 12/200,337, mailed Aug. 5, 2011, Office Action.
U.S. Appl. No. 12/200,337, mailed Mar. 15, 2012, Office Action.
U.S. Appl. No. 12/200,398, mailed May 26, 2011, Office Action.
U.S. Appl. No. 12/200,398, mailed Feb. 1, 2012, Office Action.
U.S. Appl. No. 12/200,406, mailed Jun. 29, 2011, Office Action.
U.S. Appl. No. 12/200,406, mailed Dec. 1, 2011, Office Action.

* cited by examiner

BACKDOOR DIAGNOSTIC COMMUNICATION TO TRANSCEIVER MODULE

BACKGROUND OF THE INVENTION

1. The Field of the Invention

The present invention relates generally to optoelectronic communication devices. More specifically, the present invention relates to an optical transceiver module in which diagnostic data and control functions are externally accessible during transceiver operation.

2. The Relevant Technology

Computing and networking technology have transformed our world. As the amount of information communicated over networks has increased, high-speed transmission has become ever more critical. Many high-speed data transmission networks rely on optical transceivers and similar devices for facilitating transmission and reception of digital data embodied in the form of optical signals over optical fibers. Optical networks are thus found in a wide variety of high-speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude through the transducer. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include an electro-optic transducer driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to the "controller"), which is the focus here, controls the operation of the laser driver and post amplifier.

In addition to controlling the operation of the laser driver and the post amplifier, the controller may collect and manage diagnostic data. Performance characteristics of an optical transmitter and receiver may vary in response to changes in operational conditions like temperature and voltage. For example, the threshold current and slope efficiency of a laser diode vary with temperature. To ensure the quality and integrity of data transmission, various measurement and compensation circuits may be employed by a transceiver to compensate for these changes. The transceiver controller may evaluate operating conditions, such as, but not limited to, temperature, voltage, and low frequency changes (such as receive power) from the post-amplifier and/or from the laser driver, and then adjust component settings to compensate for any changes. The operating condition parameter values, referred to collectively as "diagnostic data", may also be evaluated by the host computer system which typically has access to the controller via a serial interface.

In addition to, and sometimes in conjunction with managing diagnostic data, a controller may also drive several other transceiver functions, including, but not limited to, the following: (i) setup functions which generally relate to the required adjustments made on a part-to-part basis in the factory to allow for variations in component characteristics such as laser diode threshold current; (ii) identification information identifying the transceiver type, capability, serial number, and compatibility with various standards; (iii) eye safety and general fault detection which are used to identify abnormal and potentially unsafe operating parameters and to report these to the user and/or perform laser shutdown, as appropriate; (iv) temperature compensation functions which compensate for known temperature variations in key laser characteristics such as slope efficiency; and (v) monitoring functions that report various parameter values related to the transceiver operating characteristics and environment such as laser bias current, laser output power, received power level, supply voltage and temperature. As such, controller functions and the data contained therein are integral to network performance and, consequently, would be useful to end users such as network administrators if only the data was easily accessible.

Unfortunately, conventional host equipment often lack the ability to access the data. Other host equipment, which may be capable of accessing diagnostic data, typically lacks the means to convey the diagnostic data to an end user in an easy manner. The information can only be obtained through effort that includes additional equipment. It is therefore difficult for network administrators to determine the status of an individual link and to troubleshoot complex systems.

BRIEF SUMMARY OF THE INVENTION

These and other limitations are overcome by embodiments of the invention which relate to systems and methods for accessing transceiver diagnostic data and interfacing with transceiver control functions while the transceiver is operating within a host. The control functions allow, by way of example only and not limitation: (i) the interrogation and display of the transceiver status in real-time; (ii) the adjustment, tuning and setup of transceiver operational characteristics for specific link conditions; and, (iii) the reprogramming of transceiver operating code Exemplary embodiments of the invention relate to an optical transceiver module having a diagnostic communications link, wherein the link is configured to access diagnostic and other data contained within the transceiver controller via a backdoor interface. Controller data, including operational parameter values and module setup values, is accessible while the transceiver operates in conjunction with an external host and may be retrieved, and sometimes modified, in real time without interrupting normal transceiver operation or suspending the transmission of data over optical fibers. The data is accessed with an external device via a backdoor interface.

In evaluating operation conditions, the transceiver's controller receives analog measurements from several sensors, converts the analog signal to a digital value, performs comparison logic with the digital values and predetermined setup data, and, finally, stores the digital operating condition values and the results of the comparison logic (collectively "digital diagnostic data") in the controller's non-volatile memory. Embodiments of the present invention insert a "backdoor" on the serial interface path between the controller and host, thereby achieving access to the control module. A bidirectional communication link is then employed between the backdoor interface and an external access device such as a laptop, PDA, PC or a dedicated device. The external access device provides a means to display the data and access to the back door interface.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter. Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE SELECTED EMBODIMENTS

Figure 1A:
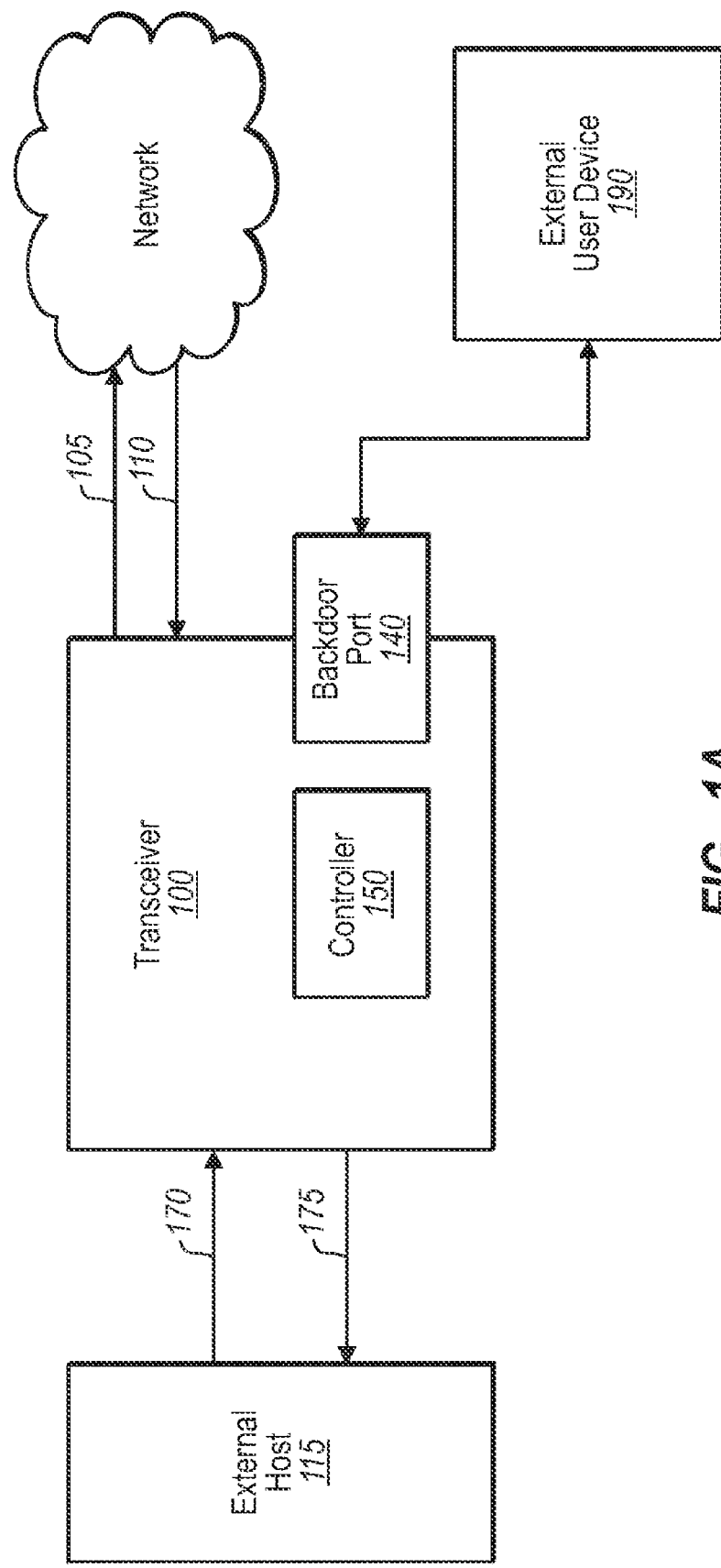
FIG. 1A illustrates a system diagram example of an optical transceiver that may implement features of the present invention.

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

As mentioned above, in addition to controlling the operation of the laser driver and the post amplifier, the controller collects and manages diagnostic data and other performance data. Further, a controller may also drive several transceiver functions, including setup functions, eye safety and general fault detection, temperature compensation functions, monitoring functions, etc. As such, transceiver controller functions and data are integrally associated with and have significant affects on with many aspects of network administration.

Embodiments of the invention provide access to diagnostic data, controller functionality, and other aspects of a transceiver. By making this type of access readily available, controller functions and diagnostic data generated within a transceiver while it is operating within a host system can provide valuable insight into several network administration concerns including transceiver's performance, the integrity of the optical link, the behavior of the optical signal, and the like. Furthermore, with access to the data and functions contained within a transceiver controller while it is operating within the host equipment, an end user could adjust operational parameters and observe the resulting effect on the optical signal in real time.

Transceiver controller functions and data may be integrally associated with and have significant affects on with many aspects of network administration. Embodiments of the invention provide means to access transceiver diagnostic data and interface with transceiver control functions while it is operating within a host. This access can allow, by way of example only: (i) interrogation and display of the transceiver status in real-time; (ii) the adjustment, tuning and setup of transceiver operational characteristics for specific link conditions; and, (iii) the reprogramming of transceiver operating code in the field.

Typically, the host equipment (such as a host computer system) is the only available interface between a transceiver module and an end user during operation. Therefore, when a transceiver generates diagnostic data, end user access to that data depends solely on whether the particular host system in which it operates has the ability to access, process, and then display the data in a meaningful way. And conventional host equipment often lack the ability to access the data. It is therefore difficult for network administrators to determine the status of an individual link and to troubleshoot complex systems. While some advanced transceiver configurations may allow an end user with the proper equipment to alter a limited number of setup values, the process required to do so is typically cumbersome, time-consuming, and requires disruption of the optical link. It is either extremely difficult or impossible for an end user to adjust a module's operational parameters to optimize its performance on less than optimal link conditions.

The present invention enables an end user to bypass the difficulties and impediments associated with gaining access to the controller via the host equipment by creating a direct link to the controller via the backdoor port. The monitoring functions of the controller can be interrogated to gain access to the various operational parameter values, and network problems may be isolated based on those values. Depending on the particular problem, a user may be able to correct it by manipulating the data contained in certain functions of the controller, i.e., a transceiver's operating characteristics may be adjusted to compensate for issues on the network. For example, if a remote transceiver is receiving a weak signal from the local transceiver, an analysis of certain operational parameters may isolate the source of the problem. If it is determined that the weak signal is the result of a distant crimp in the fiber, which would be time-consuming and expensive to fix, a user could manipulate data contained in the local transceiver's controller to increase the laser output power to compensate for the crimp; thereby, restoring the link with minimal downtime and expense.

Additionally, a user may fine-tune certain operational parameters in the controller's setup function to allow the transceiver to operate in conformance with specific link conditions. The ability to fine-tune operational parameters of a transceiver while it is operating within a host allows the end-user to make the proper adjustments quickly and efficiently. The ability to fine-tune parameters is increasingly more useful because, as optics technology advances, high capacity link conditions require increasingly precise parameter values to operate as intended. For example, wavelength-division multiplexing ("WDM"), which multiplexes multiple signals on a single link by using different wavelengths to carry different signals, may require precise laser temperature and frequency controls. Access to the controller setup function enables a user to configure a module's relevant operating characteristics in real-time precisely as required by the particular link on which it is being used.

Moreover, access to the controller permits an end user to reprogram the operating code ("firmware") that drives the transceiver control function and, accordingly, transceiver operation. Generally, due to the manner in which transceivers are used and the nature of firmware, end users cannot alter the operating code that exists in a transceiver when it was purchased. In fact, without controller access, the reprogramming of module firmware rarely takes place outside of a laboratory or production line. Therefore, if a firmware upgrade is required, either to add features or fix a bug in a particular production lot, every unit must be shipped to the manufacturer for reprogramming and then shipped back to the end user. However, recalling a lot of transceivers to reprogram them would typically only be considered as a last resort due to the excessive time and expense involved with the process. In addition, the procedure to have the transceivers reprogrammed involves significant risk to the integrity of module components. Removing the unit from the host, packaging it, shipping it, unpacking it and handling it risks physical damage to sensitive hardware components and circuit exposure to electrostatic discharge ("ESD"). Therefore, the ability to reprogram a transceiver in the field may be quite useful in some circumstances.

Reprogramming a module in the field allows an authorized user to upgrade the version of firmware that a particular transceiver is running, possibly adding new features or increasing functionality. Also, where transceivers were mistakenly introduced into the market with latent defects, certain operational defects may be cured with new firmware. Even defects in transceiver hardware may be compensated for or "patched" by the upgrading the operating code. Access to the controller enables a transceiver to be reprogrammed in the field, thus eliminating the expense and downtime associated with shipping defective units back to the manufacturer for firmware upgrades.

Referring to the system overview illustrated in FIG. 1A, exemplary embodiments of the invention relate to an optical transceiver module 100 having a diagnostic communications link, wherein the link is configured to access diagnostic and other data contained within the transceiver controller 150 via a backdoor port 140. Controller data, including operational parameter values and module setup values, is accessible while the transceiver 100 operates in conjunction with an external host 115, as represented by arrows 170 and 175, and may be retrieved, and sometimes modified, in real time without interrupting normal transceiver operation or suspending the transmission of payload data over optical fibers 105 and 110. The controller data is accessed with an external user device 190 via the backdoor port 140 which is accessed through the face of the transceiver module 100.

External user devices that may be employed in conjunction with the invention include PCs, cellular telephones, PDAs, laptop computers and any other device having a presentation mechanism or an associated presentation mechanism and is suitably equipped to establish communication with the backdoor port 140 of the transceiver module 100. In particular, exemplary embodiments of the invention are directed to the use of a laptop computer as an external user device. However, exemplary embodiments of the invention should not be construed to be limited to the use of laptop computers.

Figure 1B:
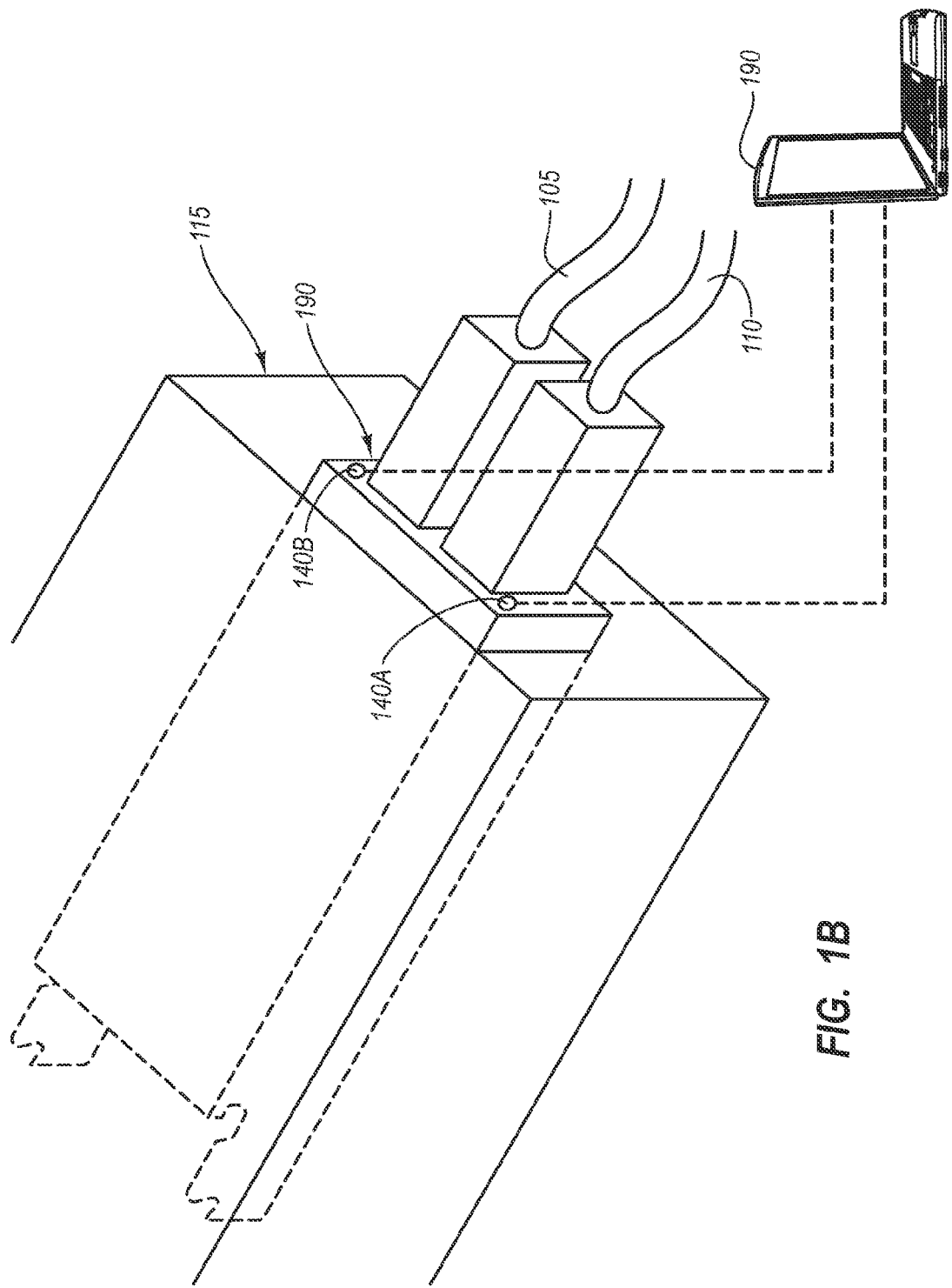
FIG. 1B illustrates an exemplary embodiment of the system diagram of FIG. 1A.

FIG. 1B illustrates an exemplary embodiment of the system diagram of FIG. 1A. The transceiver 100 is engaged with the external host 115 such that it may transfer optical payload data over fibers 105 and 110. The backdoor port is represented by 140A and 140B. The backdoor port input is represented by 140A and the backdoor port output is represented by 140B in this example. The external user device 190 is represented as a laptop computer in this embodiment and may interface with the backdoor port 140 in several different forms of communication including optically, electrically, electromagnetically, or any combination thereof as described further herein.

An example operational optical transceiver environment, with a focus on controller functionality, will first be described. Then, the operation in accordance with the invention will be described with respect to the operational environment.

While the optical transceiver 100 will be described in some detail, the optical transceiver 100 is described by way of illustration only, and not by way of restricting the scope of the invention. The principles of the present invention are suitable for 1G, 2G, 4G, 8G, 10G, 40G, 100G and higher bandwidth fiber optic links. Furthermore, the principles of the present invention may be implemented in optical (e.g., laser) transmitter/receivers of any form factor such as XFP, SFP and SFF, or others, without restriction. Having said this, the principles of the present invention can be implanted in other technologies and are not limited to an optical transceiver environment at all.

Figure 2:
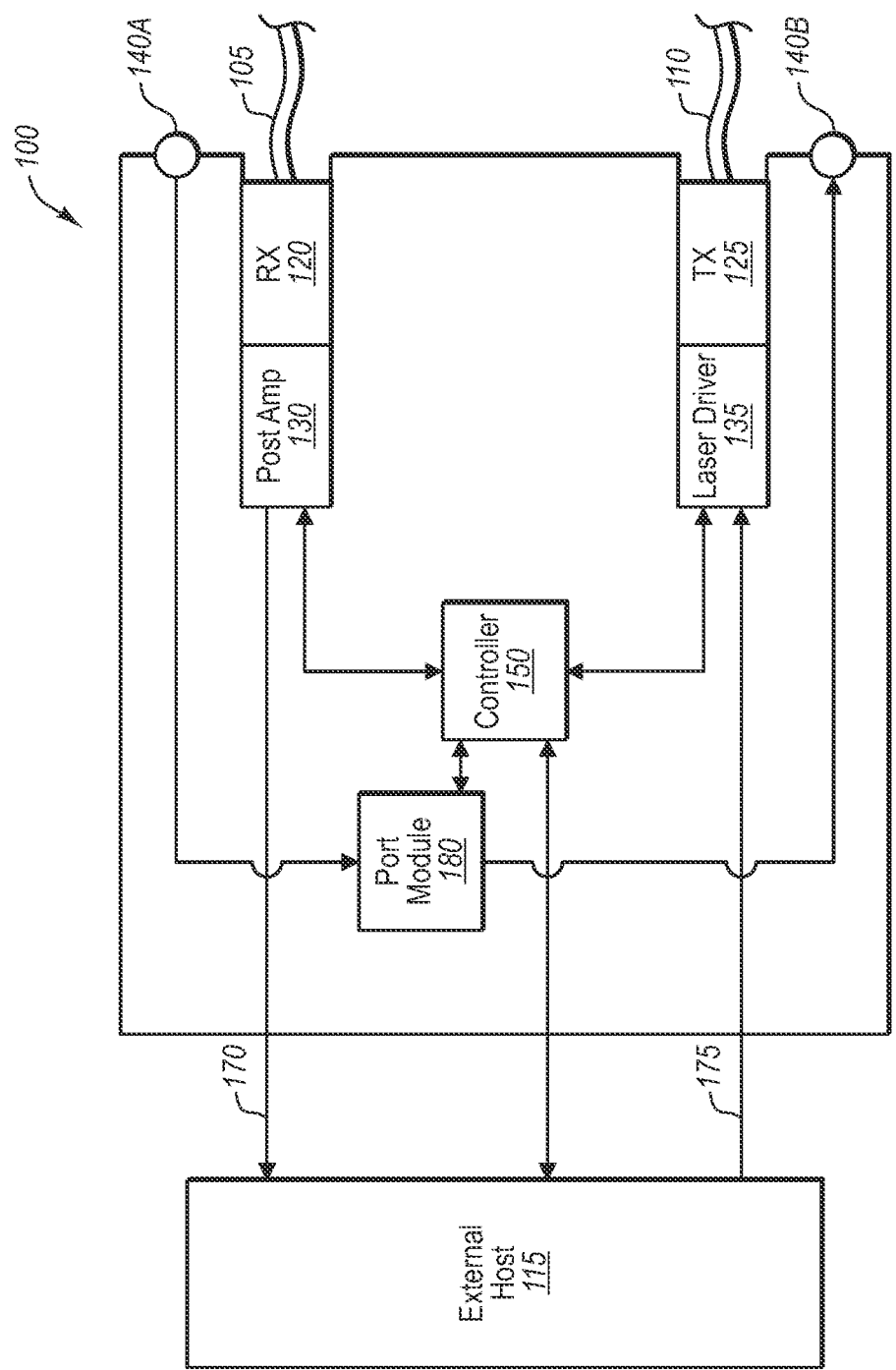
FIG. 2 is a block diagram that illustrates the transceiver module of FIG. 1A in further detail.

As shown in FIG. 2, the optical transceiver 100 receives an optical signal from fiber 105 using receiver 120. The receiver 120 acts as an opto-electric transducer by transforming the optical signal into an electrical signal. The receiver 120 provides the resulting electrical signal to a post-amplifier 130. The post-amplifier 130 amplifies the signal and provides the amplified signal to an external host computing system represented by arrow 170. The external host 115 may be any computing system capable of communicating with the optical transceiver 100. The transceiver 100, alternatively, perform additional processing on the electrical signal prior to providing it to the host 115.

The optical transceiver 100 may also receive electrical signals from the host 115 for transmission onto the fiber 110. Specifically, the laser driver 135 receives an electrical signal from host 115 as represented by the arrow 175, and drives the transmitter 125 (e.g., a laser or Light Emitting Diode (LED)) to emit optical signals onto the fiber 110, where optical signals are representative of the information in the electrical signal provided by the host 115. Accordingly, the transmitter 125 serves as an electro-optic transducer.

The behavior of the receiver 120, the post-amplifier 130, the laser driver 135, and the transmitter 125 may vary dynamically due to a number of factors. For example, temperature changes, power fluctuations, and feedback conditions may each affect the performance of these components. To ensure the quality and integrity of data transmission, various measurement and compensation circuits may be employed to compensate for these changes. The measurement and compensation circuits are managed by the control module of the transceiver, hereinafter "controller" 150.

The controller 150 collects and evaluates diagnostic data, such as, but not limited to, temperature, voltage, and low frequency changes (such as receive power) from the post-amplifier 130 (as represented by arrow 180) and/or from the laser driver 135 (as represented by arrow 185). In evaluating operation conditions, the controller 150 receives analog measurements from several sensors, converts the analog signal to a digital value, performs comparison logic with the digital values and predetermined setup data, and, finally, stores the digital operating condition values and the results of the comparison logic (collectively "digital diagnostic data") in the controller's 150 non-volatile memory. Some of the digital diagnostic data can be collected directly and may not be subject to comparison logic or to analog to digital conversion. This allows the controller 150 to optimize the dynamically varying performance, and additionally detect when there is a loss of signal. Specifically, the controller 150 may counteract these changes by adjusting settings on the post-amplifier 130 and/or the laser driver 135 as also represented by the arrows 180 and 185.

The manner in which the controller manages the transceiver operation is governed by the controller's firmware. The controller's firmware is located in non-volatile memory and typically includes several control functions including, but not limited to the following:

Setup functions. These generally relate to the required adjustments made on a part-to-part basis in the factory to allow for variations in component characteristics such as laser diode threshold current.

Identification. This refers to general purpose memory, typically EEPROM (electrically erasable and programmable read only memory) or other nonvolatile memory. The memory may be accessible using a serial communication standard, that is used to store various information identifying the transceiver type, capability, serial number, and compatibility with various standards. While not standard, this memory may also store additional information, such as sub-component revisions and factory test data.

Eye safety and general fault detection. These functions are used to identify abnormal and potentially unsafe operating parameters and to report these to the host and/or perform laser shutdown, as appropriate.

Temperature compensation functions. For example, compensating for known temperature variations in key laser characteristics such as slope efficiency.

Monitoring functions. Monitoring various parameters related to the transceiver operating characteristics and environment. Examples of parameters that may be monitored include laser bias current, laser output power, receiver power levels, supply voltage and temperature. Ideally, these parameters are monitored and reported to, or made available to, a host device and thus to the user of the transceiver.

Power on time. The transceiver's control circuitry may keep track of the total number of hours the transceiver has been in the power on state, and report or make this time value available to a host device.

Margining. "Margining" is a mechanism that allows the end user to test the transceiver's performance at a known deviation from ideal operating conditions, generally by scaling the control signals used to drive the transceiver's active components.

Other digital signals. A host device may configure the transceiver so as to make it compatible with various requirements for the polarity and output types of digital inputs and outputs. For instance, digital inputs are used for transmitter disable and rate selection functions while outputs are used to indicate transmitter fault and loss of signal conditions. The configuration values determine the polarity of one or more of the binary input and output signals. In some transceivers, these configuration values can be used to specify the scale of one or more of the digital input or output values, for instance by specifying a scaling factor to be used in conjunction with the digital input or output value.

Figure 3:
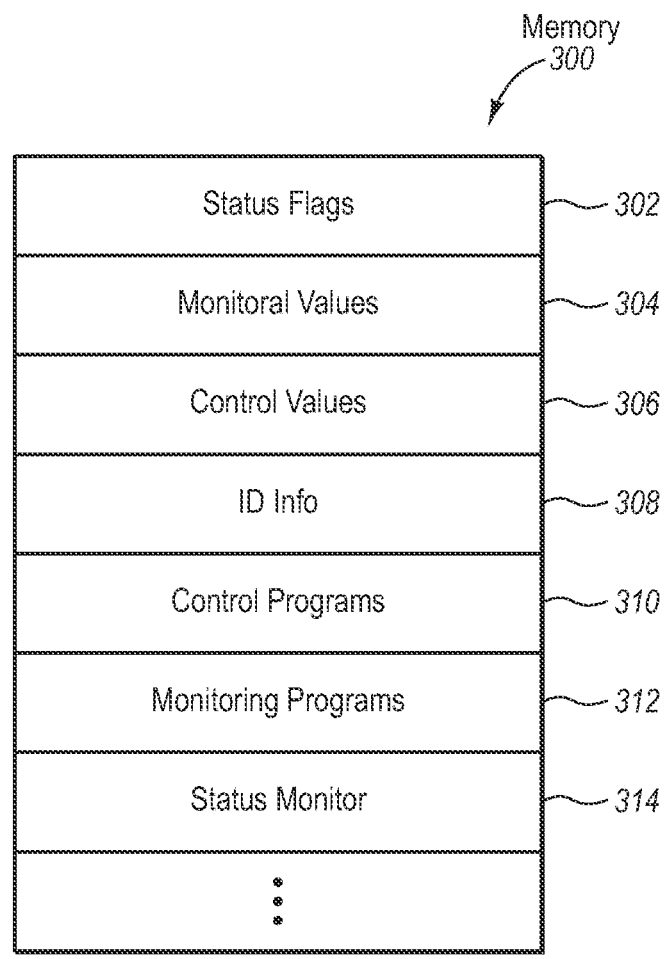
FIG. 3 illustrates an exemplary memory map within the controller of the transceiver module of FIG. 2.

FIG. 3 is a block diagram illustrating an example of a memory map 300 employed by transceiver control functions. Referring to this figure, in some embodiments the memory 300 stores the following programs, modules and data structures, or a subset thereof:

status flags 302;
monitored values 304;
control values 306;
identifying information 308;
control programs 310;
monitoring programs 312; and
status monitor 314.

Status flags 302 may include comparisons of operating conditions with warning alarms. In some embodiments, status flags 302 may include low and high level alarm flags.

Monitored values 304 may include values associated with an operating condition of the transceiver, such as a power supply voltage level, a bias current level, a received optical power level, a transmitter output power level, an internal temperature.

Control values 306 may include values associated with controlling the operation of the fiber optics transceiver.

Identifying information 308 may include information identifying the transceiver, such as the serial number of the transceiver or other types of identifiers.

Referring again to FIG. 2, the backdoor port input 140A and the backdoor port output 140B interface with controller 150 via the port module 180. The port module 180 facilitates the transfer of data between the controller 150 and the backdoor ports 140A and 140B by providing the necessary conversion components such that the transferred data is in the appropriate format to be properly conveyed.

In one embodiment, the external user device accesses the optical ports via an optical connection assembly. The optical connection assembly may be a cable having a USB connector on one end for use with the external user device, a laptop in this example, and a second end which forms a clip that fits over the face of the transceiver. The clip end of the optical connection assembly that attaches to the face of transceiver contains optical subassemblies positioned to interface with the optical ports on the face of the transceiver. Thereby allowing data to be transferred between the optical port on the face of the transceiver and the external user device. Embodiments of the clip are described in more detail in co-pending application Ser. No. 12/184,042, entitled "Optical Transceiver with LED Link Information Indicator", and filed the same day as the present application, which application is hereby incorporated by reference.

Figure 4A:
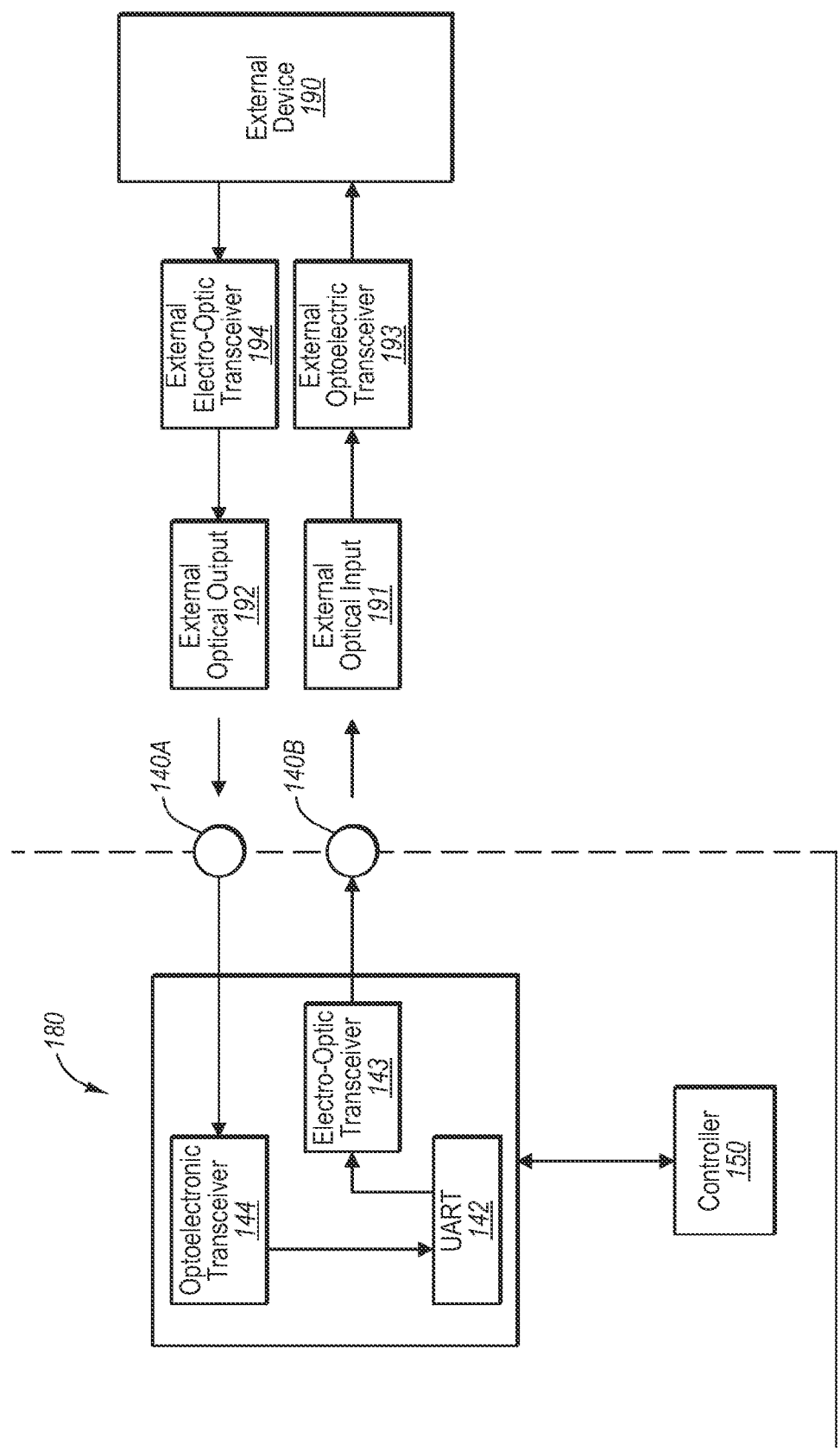
FIG. 4A schematically illustrates an exemplary embodiment of the port module of FIG. 2.

FIG. 4A illustrates an embodiment of the port module 180 wherein data is communicated between the transceiver 100 and the external user device 190 optically. Information is sent to and from the controller 150 via a universal asynchronous receiver/transmitter (UART) 142 using standard non-return-to-zero (NRZ) serial data. The term "universal asynchronous receiver/transmitter" or "UART" refers to a piece of computer hardware that translates data between parallel and serial interfaces. Used for serial data telecommunication, a UART converts bytes of data to and from asynchronous start-stop bit streams represented as binary electrical impulses. Many microcontrollers have UART hardware which would otherwise not be used in existing fiber optic transceiver designs. The term "non-return-to-zero" or "NRZ" refers to code in which "1s" are represented by one significant condition and "0s" are represented by another, with no neutral or rest condition, such as a zero amplitude in amplitude modulation (AM), zero phase shift in phase-shift keying (PSK), or mid-frequency in frequency-shift keying (FSK). Utilizing this type of communication link, this exemplary embodiment requires only one "wire" or "path" in each direction, i.e., one input, one output, two "paths," and is amenable to single wire communication as well. Transmission and reception of data may be either full duplex (sending and receiving simultaneously) or half-duplex (sending and receiving in turn but not simultaneously). However, exemplary embodiments of the invention should not be construed to be limited to the use of UARTs using NRZ serial data. Alternative communication formats that possibly may be used to communicate with the controller 150 include an inter-integrated chip (I²C) bus or a serial peripheral interface (SPI) bus.

Figure 4B:
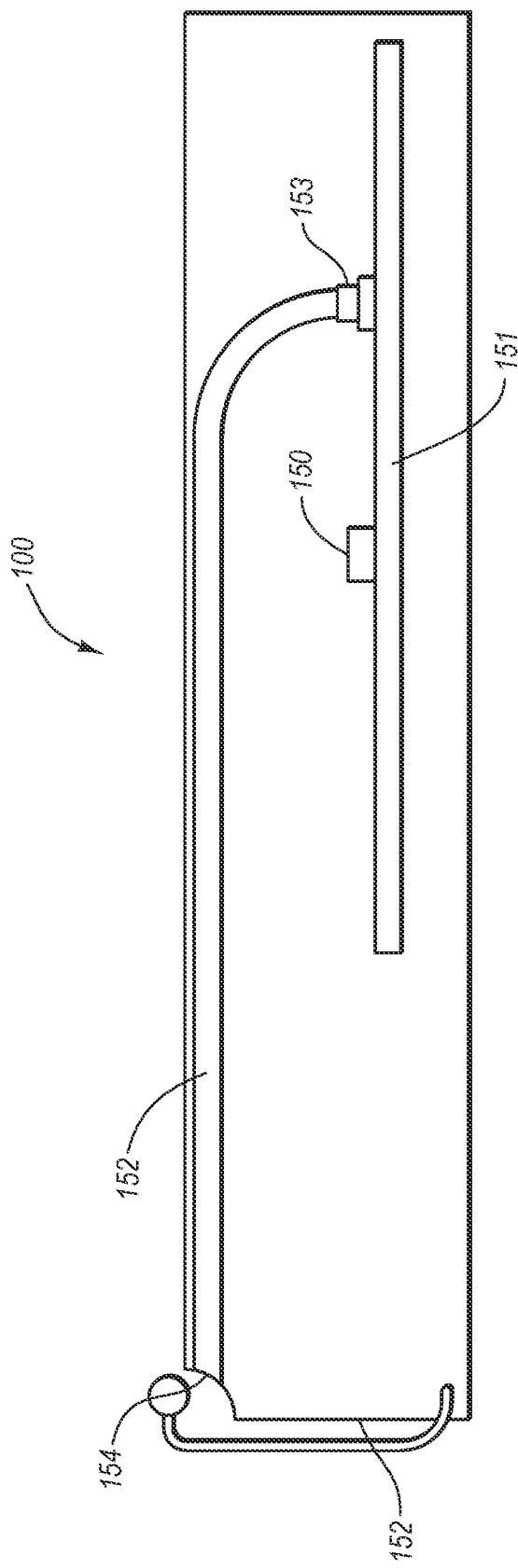
FIG. 4B illustrates a side view of the transceiver module of FIG. 1A having an exemplary embodiment of the port module of FIG. 4A.

Data being transmitted from the controller 150 is carried in this format to a transceiver-side electro-optic transducer 143 for conversion from an electrical signal to an optical signal. The optical signal is then output through the transceiver optical output, represented here as the backdoor port output 140B, and received by the external optical input 191. In one embodiment, the electro-optical transducer 143 is a light-emitting diode (LED) (but may also be a laser diode) located on the printed circuit board of the transceiver. As illustrated in FIG. 4B, the controller 150 is located on the printed circuit board 151 with the LED 153. The optical output from the LED 153 is carried to face 156 of the transceiver 100 via a light pipe assembly 152. The light pipe assembly 152 extends from the LED 153 to an opening 154 on the face 156 of the transceiver 100 such that the optical signal may be accessed by components external to the transceiver, namely the external user device. Once received, the optical signal is then converted back into an electrical signal by an external optoelectronic transducer 193 in order that it may be received by the external device 190.

Figure 4C:
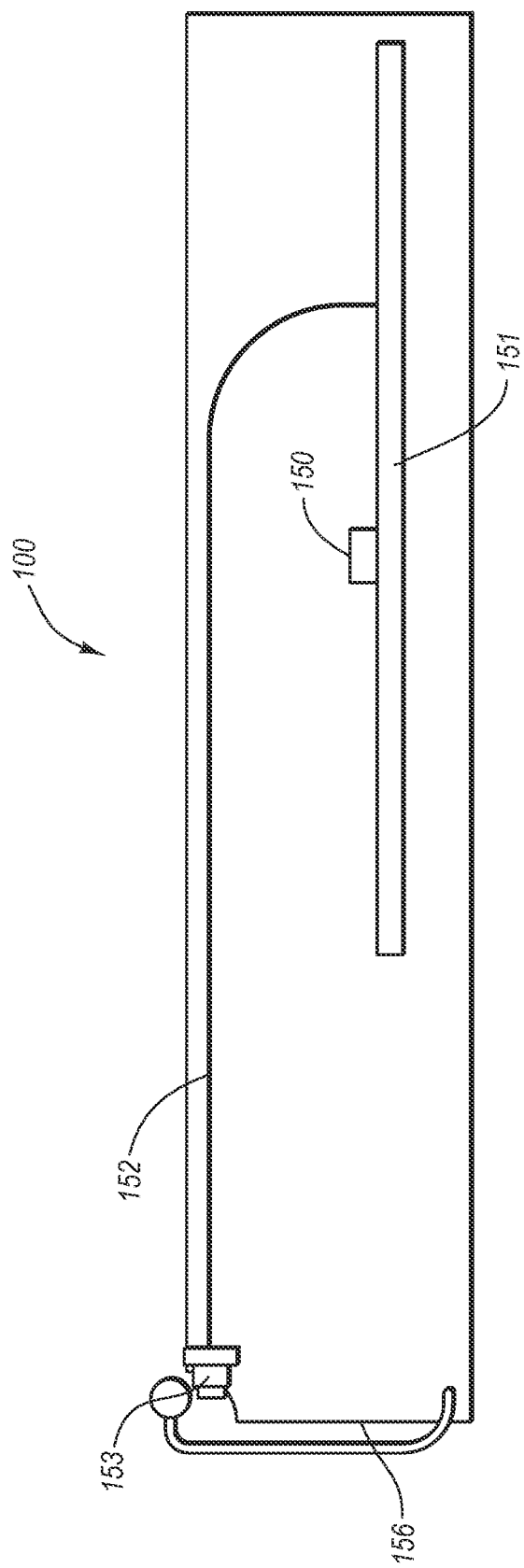
FIG. 4C illustrates a side view of the transceiver module of FIG. 1A having an alternative exemplary embodiment of the port module of FIG. 4A.

Alternatively, the optical components of the port module may be integrated directly into the face of the transceiver as shown in FIG. 4C. In this embodiment, the LED 153 is located directly in the face 156 of the transceiver 100 and communicates with the controller 150 via an electrical connection 157 to the printed circuit board 157.

Data is transmitted from the external device 190 to the controller 150 in much the same manner. As shown in FIG. 4A, an electrical signal is transmitted from the external device 190 to the external electro-optic transducer 194 for conversion to an optical signal in order that it may be properly output by the external optical output 192. The signal is then received by the transceiver optical input, represented here as backdoor port input 140A, and converted back into an electrical signal by the transceiver-side optoelectronic transducer 144 and sent to the controller 150 via the UART 142. In one embodiment, the optical signal from the external user device is received by a light pipe assembly which extends from the face of the transceiver and carries the optical signal to photo transistor (or photodiode) located on the PCB of the transceiver. The photo transistor, acting as the optoelectronic transducer, converts the optical signal to an electrical signal such it can be received by the controller.

In one embodiment the transceiver-side electro-optic transducer 143 and optoelectronic transducer 144 are implemented as a single light emitting diode (LED). The same LED that transmits optical data can also act as an optical receiver and collect an optical signal by utilizing its photovoltaic properties.

Figure 5:
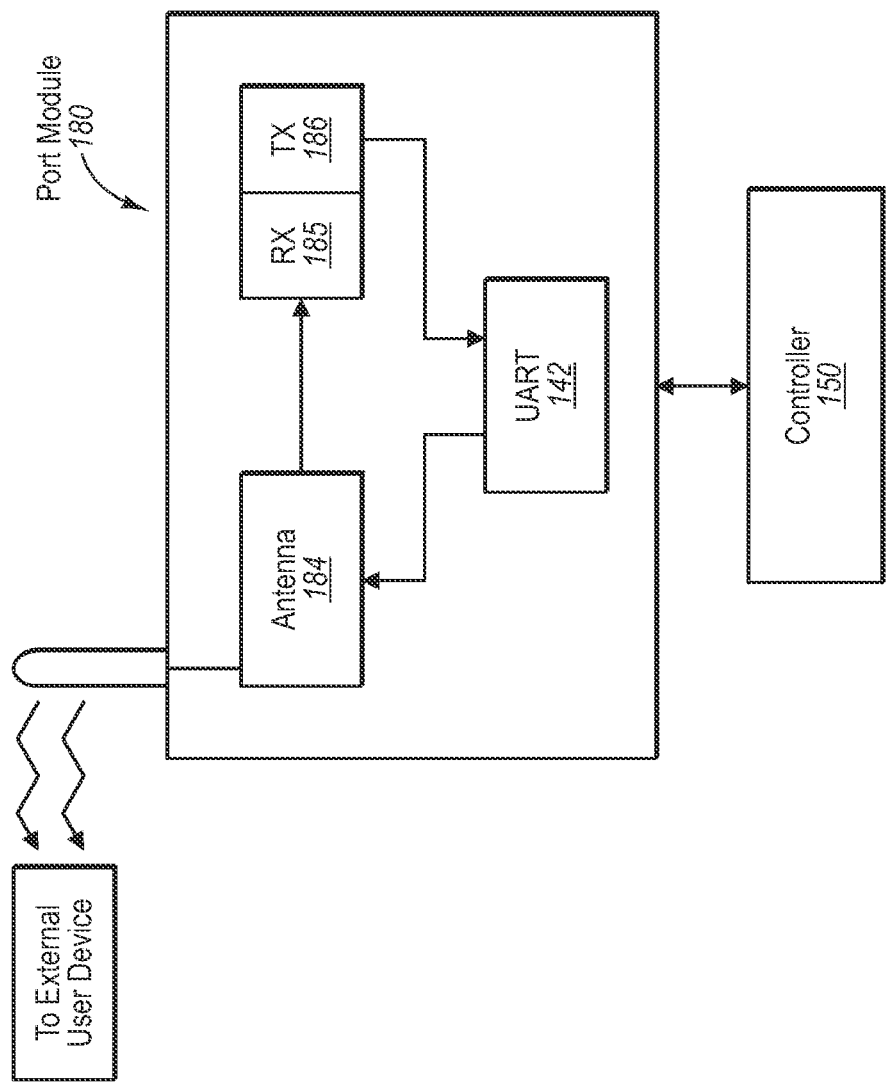
FIG. 5 schematically illustrates an alternative exemplary embodiment of the port module of FIG. 2.

FIG. 5 illustrates yet another embodiment of the port module 180 wherein the port module 180 is configured for an electromagnetic wireless transfer of data from the transceiver 100 to the external user device 190. In this embodiment, the port module 180 includes an antenna 184 to wirelessly transfer and receive data. The antenna 184 is a transducer designed to transmit and receive electromagnetic waves. In other words, the antenna 184 converts electromagnetic waves into electrical currents and vice versa. The antenna 184 may be implemented as a feature on the face of the transceiver module such as the bail lever that is used to unlock the module from the host. The transmitter 186 works in conjunction with the antenna 184 to propagate the electromagnetic signal. The transmitter 186 may include a number of components including a power supply, an oscillator, a modulator, and amplifiers. The modulator is the component which modulates signal information onto the carrier frequency, which is then broadcast. The receiver 185 receives input from the antenna 184, uses electronic filters to separate the desired radio signal from undesired other signals picked up by antenna 184, amplifies the signal to a level suitable for further processing, and finally converts the signal through demodulation and decoding into a form usable for the UART 142. An authentication module 182 verifies the data packet identification and format and a UART 142 converts the data into a format that may properly interface with the controller 150. Typically, a unique serial number is associates with each Blue Tooth device or other radio means such that each device may be differentiated from another. A wireless implementation of the port module may be implemented such that several transceiver modules may be interrogated simultaneously. In addition, the input 140A and output 140B may be included as part of the antenna in some instances.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A transceiver module configured to interface with both a host system and a separate external device, the transceiver module comprising:

a printed circuit board configured to interface with the host system;

a memory electrically connected to the printed circuit board, the memory configured to store transceiver operating code;

an optical transmitter assembly electrically connected to the printed circuit board, the optical transmitter assembly configured to connect to a network over a first port;

an optical receiver assembly electrically connected to the printed circuit board, the optical receiver configured to connect to the network over a second port;

a diagnostic port assembly communicatively connected to the printed circuit board, the diagnostic port assembly configured to enable the external device to interface with the transceiver while the optical transmitter assembly and the optical receiver assembly continue to operate over the network, the diagnostic port assembly further configured to receive as input updated transceiver operating code to be stored in the memory.

2. The transceiver module of claim 1, wherein the diagnostic port assembly comprises an electrical output component and an electrical input component.

3. The transceiver module of claim 1, wherein the diagnostic port assembly comprises an antenna, a transmitter and a receiver to interface with the external device wirelessly.

4. The transceiver module of claim 1, wherein the diagnostic port assembly comprises a second optical transmitter assembly and a second optical receiver assembly to communicate optically with the external device.

5. The transceiver module of claim 4, wherein the second optical transmitter assembly transmits data with a particular light emitting diode and the second optical receiver assembly receives data using photovoltaic properties of the light emitting diode.

6. The transceiver module of claim 1, wherein the diagnostic port assembly is further configured to generate as output and/or receive as input at least one of digital diagnostic data, adjusted setup values, identification information, eye safety and general fault detection information, temperature compensation functions, monitoring functions, power on time data, and margining data.

7. The transceiver module of claim 1, further comprising a controller for managing transceiver operation with operational parameter values and module setup values.

8. The transceiver module of claim 7, wherein the transceiver receives adjusted transceiver setup values and adjusted operational parameter values from the external user device over a diagnostic link that is independent of the network without interrupting normal transceiver operation or suspending the communication of payload data via the optical transmitter and optical receiver.

9. The transceiver module of claim 7, wherein the diagnostic port assembly is coupled to the controller through a universal asynchronous receiver/transmitter (UART.

10. The transceiver module of claim 1, wherein diagnostic port assembly includes a backdoor interface on the outside of the transceiver module.

11. The transceiver module of claim 7, wherein the controller receives analog measurements from several sensors, converts the analog signal to a digital value, performs comparison logic with digital values and predetermined setup data, and stores the digital operating condition values and the results of the comparison logic in the memory.

12. The transceiver module of claim 11, wherein access to the stored digital operating condition values and the results of the comparison logic are accessible by the external user device via the diagnostic port assembly.

13. The transceiver module of claim 7, wherein the controller is configured to store information regarding integrity of the optical link to the memory and makes the information regarding integrity of the optical link accessible to the external user device via the diagnostic port assembly.

14. The transceiver module of claim 7, wherein the controller is configured to store information regarding behavior of the optical signal to the memory and to make the information regarding behavior of the optical signal accessible to the external user device via the diagnostic port assembly.

15. The transceiver module of claim 7, wherein the controller is configured to receive an updated version of firmware from the external user device via the diagnostic port.

16. The transceiver module of claim 1, wherein the diagnostic port assembly includes an inter-integrated chip bus.

17. The transceiver module of claim 1, wherein the diagnostic port assembly includes an inter-integrated chip bus.

18. The transceiver module of claim 1, wherein the controller communicates wirelessly with the external device.

19. The transceiver module of claim 18, wherein the diagnostic port assembly includes a wireless device that differentiates the transceiver module from other transceiver modules.

20. The transceiver module of claim 1, wherein the diagnostic port assembly is configured to receive as input the updated transceiver operating code from the external device.

* * * * *